United States Patent [19]

Graham

[11] 4,142,933

[45] Mar. 6, 1979

[54] MANUFACTURE OF INSULATING PRODUCTS

[75] Inventor: Robert Graham, Great Lumley, England

[73] Assignee: Newalls Insulation Co. Ltd., Manchester, England

[21] Appl. No.: 750,358

[22] Filed: Dec. 14, 1976

[30] Foreign Application Priority Data

Dec. 30, 1975 [GB] United Kingdom ............... 53221/75

[51] Int. Cl.[2] ......................... D21J 3/00; A47J 19/02; B01D 25/32

[52] U.S. Cl. ...................................... 162/396; 100/37; 100/116; 100/208; 100/237; 100/255; 162/218; 162/227; 210/225; 210/400; 425/356; 425/411; 425/412

[58] Field of Search ............... 162/218, 225, 227, 396, 162/398, 399, 181 C, 153; 100/257, 237, 208, 255, 116, 37, 95; 425/338, 356, 411, 412; 210/225, 400, 401

[56] References Cited

U.S. PATENT DOCUMENTS

| | | | |
|---|---|---|---|
| 247,909 | /1881 | Haynes | 100/208 |
| 256,904 | /1882 | Laass | 100/237 |
| 1,008,556 | 11/1911 | Pancoast | 100/257 |
| 1,920,481 | 8/1933 | Sutherland | 162/227 |
| 2,699,097 | 1/1955 | Binkley | 162/153 |
| 3,056,718 | 10/1962 | Grissom et al. | 162/225 |
| 3,638,559 | 2/1972 | Parker | 100/208 |

*Primary Examiner*—S. Leon Bashore
*Assistant Examiner*—Peter Chin
*Attorney, Agent, or Firm*—William Anthony Drucker

[57] ABSTRACT

A filter press, e.g. for the manufacture of insulation products from an aqueous slurry, which has a number of movable platen portions. The platens have individual actuating means which are adjustable relative to one another but are controlled by a common drive which can move all the portions simultaneously as one platen.

Also the method of using the press for the manufacture of insulation products.

8 Claims, 2 Drawing Figures

MANUFACTURE OF INSULATING PRODUCTS

Figure 1:
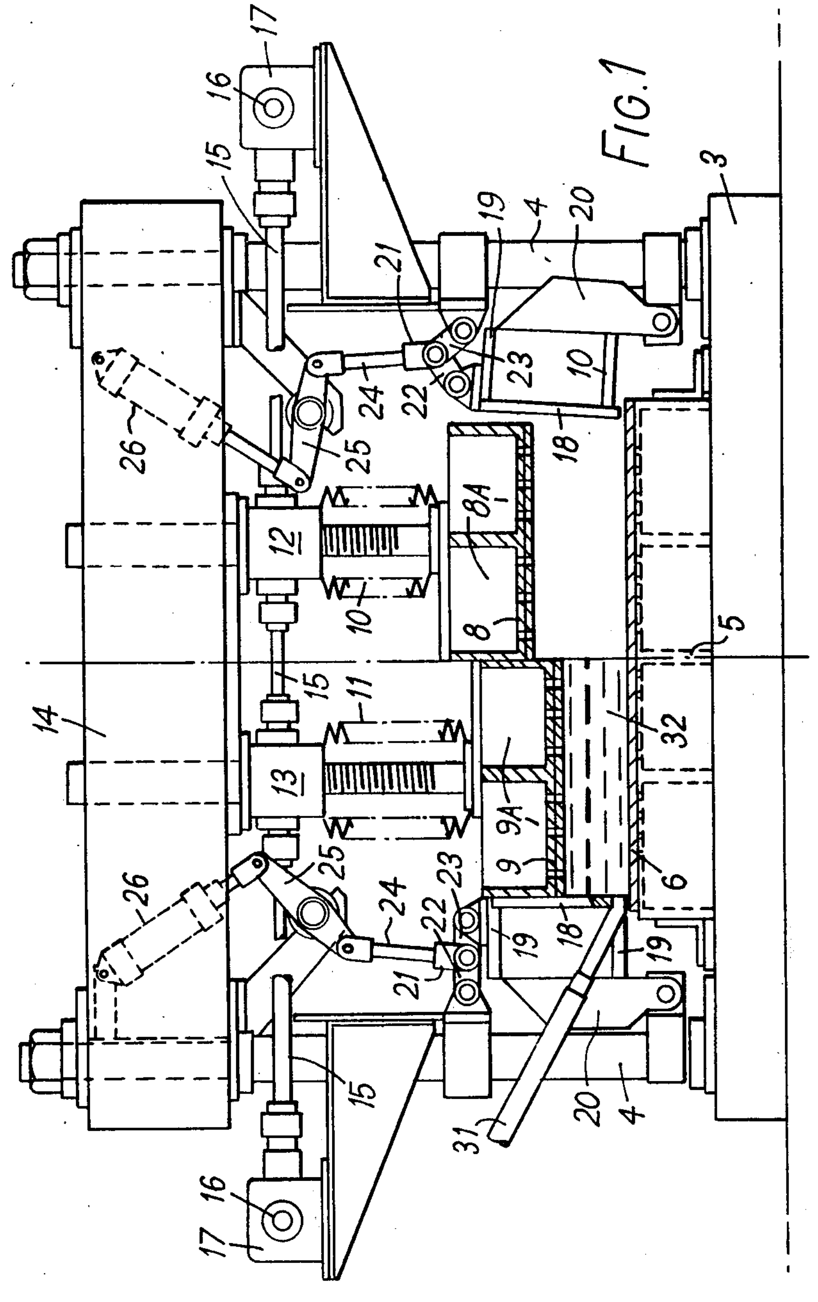

The present invention relates to the manufacture of sheet or slab form insulation products from relatively free flowing slurries, for example containing calcium silicate and/or fibre. In particular it relates to a filter press which can be used to make such products. It also relates to a method of making sheet or slab form insulation products.

Such products may be made by paper and/or board making techniques, they may also be made by filter pressing in which a measured volume of slurry is poured into a foraminous mould cavity and then dewatered by pressing.

Conventional platen presses can be used for this, but uneven pressure distribution and fluid leakage around the edges of the press platen tend to give a product of irregular thickness and density.

It is an object of the present invention to provide an improved filter press for manufacturing such sheet or slab form insulation products and it is a further object of the invention to provide an improved method for use with this press.

According to the invention, a filter press includes a plurality of movable platen portions, each with individual actuating means which are adjustable relative to one another, but which are also controlled by a common drive arranged and adapted, in operation, to move all the platen portions substantially simultaneously as a single platen.

Preferably, the press further includes means defining a mould cavity, said means comprising sidewall members movable into and out of substantially sealing relation with the periphery of the platen portions as a whole together with an endless filter band so disposed as to constitute a face of the mould cavity directly opposed to the platen portions. Preferably, one sidewall member is also moveable in a direction away from the filter band so as to enable advancement of the filter band to carry a product out of the mould cavity. The filter band may be arranged to discharge the product onto a conveyor belt provided with length/width trimming apparatus for the product.

Advantageously, the platen portions are arranged end-to-end lengthwise of the press, each platen portion having a width substantially equal to the width of the product to be made, the length of the press being its dimension in the direction of travel of the endless filter band. The individual actuating means may be screw jacks driven by a common drive shaft, to ensure that once the jacks have been adjusted to produce a product of uniform thickness, this setting will be accurately repeated for each succeeding product. Preferably at least four jacks are provided for each platen portion.

The use of screw jacks and a common drive shaft has the added advantage that the platen portions can be stopped at any point in their range of movement, without the need for fixed limit stops, as in a conventional platen press. It follows that all of the available pressure is applied to the product and not directly to the hardware of the press, thus allowing preselection of the finished product thickness.

Furthermore, the density of the product can also be controlled by adjusting the position of the platen portions prior to pumping the slurry into the mould cavity.

It should be noted that having made one sheet or slab, the platen portions can be raised to create a new mould cavity on top of the first sheet or slab. A second sheet or slab can then be made on top of the first, using the same or a different slurry. It is thus possible to form laminated products wherein each layer is of different density and/or composition to the next layer.

According to a further aspect of the present invention, a method of manufacturing sheet or slab form insulation products from an aqueous slurry containing calcium silicate and/or fibre comprises pumping the slurry into a closed mould cavity in a platen filter press, at least one wall of the mould cavity being foraminous to an extent sufficient to allow the escape substantially only of fluid, stopping the pumping at a predetermined level of back pressure in the mould cavity, followed by closing the press to reduce at least one dimension of the mould cavity a prechosen amount.

Positively pumping the slurry into the mould cavity up to a predetermined level of back pressure achieves firstly, a higher solids content in the mould cavity, coupled with a degree of de-watering prior to pressing. Secondly it makes for an improved control of both product density and regularity, since the volume of solids in the cavity prior to pressing can be controlled by selecting the appropriate back pressure.

The problem of leakage around the platen of a conventional platen press can be minimized by making the platen a close fit within the walls of the mould cavity. The latter may be simply a rectangular frame constituting four side walls, the bed of the press constituting the bottom wall and the platen constituting the top wall of the cavity. The bottom wall, that is the press bed, may be a filter cloth stretched over an apertured backing plate and the filter cloth may be in the form of an endless band or it may be static, but in either case removal of the product after pressing can be effected by raising the press platen clear of the cavity side walls prior to sliding the mould cavity out of the press. Where the mould cavity is in the form of a rectangular frame the method of the invention preferably therefore includes the additional step of opening the press at least sufficiently to enable the mould cavity to be withdrawn and/or inserted into the press, an appropriate. It should be noted in this context that the slurry is most conveniently supplied to the mould cavity through a supply aperture in the side walls of the cavity.

The desired back pressure can be controlled by using air pressure as the pumping medium, for example, by pressurising with air a stock chamber which supplies the mould cavity. When the back pressure in the mould cavity reaches the level of the air pressure the flow will naturally cease and this may be monitored either by suitable instrumentation or visually by an operative.

Although conventional filter presses can be used with relatively minor modifications to carry out the method of the invention, they tend to be massive in construction, especially where pressure has to be applied evenly over a large area to make a product of sensibly constant thickness. The use of fixed limit stops to control platen displacement inevitably results in the press frame being subjected to very heavy loading and it must, therefore, be built to withstand such loading.

It is therefore preferred that a filter press according to the present invention be used to carry out the method, particularly as the position of the platen portions can be adjusted to control product density, in addition to the control already effected by adjustment of the back pressure.

Figure 2:
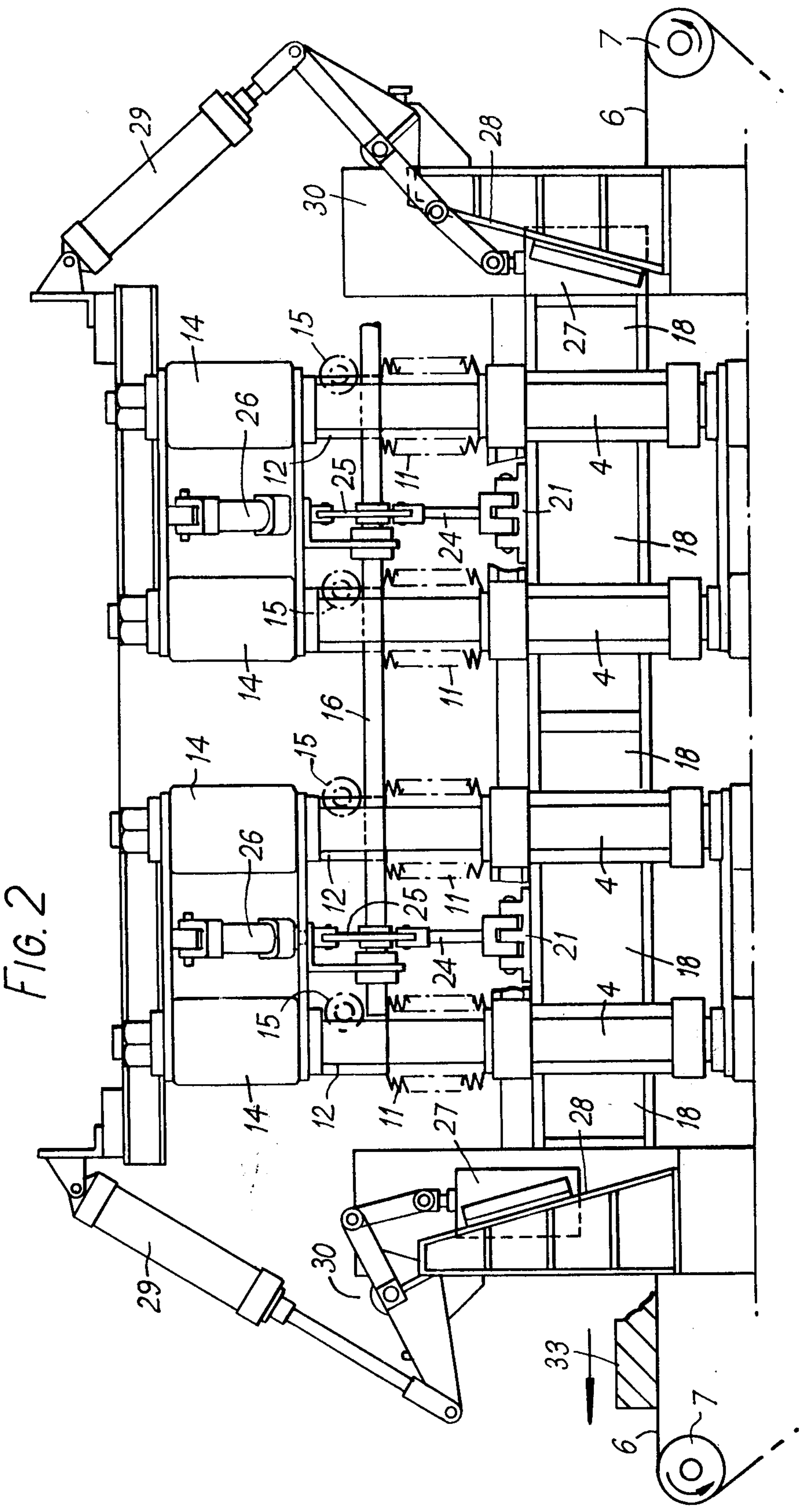

In order that the invention be better understood, a preferred embodiment of it will now be described by way of example with reference to the accompanying drawings in which:

FIG. 1 is an end view, partially in section, through a platen press according to the invention, the section being taken in a plane normal to the direction of travel of the filter band and, FIG. 2 is a side view of the press of FIG. 1.

For convenience, like reference numerals will be applied to like parts in both figures.

In the figures, the press comprises a fixed bed 3, supporting pillars which extend above the bed and carry other parts of the press. Mounted on the bed 3, an apertured staging 5 supports an endless filter cloth 6 mounted for circulation around end/drive rollers 7, shown only in outline in FIG. 2. Purely to illustrate the operation of the press, in FIG. 1 a single platen portion has been "split" along the centre line of the press into two parts, one part 8 is shown in an "up" or open position whilst the other part 9 is in a "fill position", as will be described later. Each platen portion is connected to four screw jacks, 10, 11, and, through the body of geared drives 12, 13 for the jacks, to a fixed cross bar 14, which is carried by the pillars 4. The geared drives 12, 13 are linked to drive shafts 15 to line shafts 16 which extend lengthwise of the press (i.e. normal to the plane of FIG. 1 and parallel to the plane of FIG. 2), right angle drive boxes 17 being provided on each side of the press. In the press shown in FIG. 2 there are two platen portions along the length of the press, each being similar and driven by the line shafts 16 in exactly the same way, a common drive motor (not shown) being provided at one end of the machine to rotate both line shafts through exactly the same angular distance, as required to operate the process and as will be discussed later. It will be appreciated that the press may be lengthened by simply providing further platen portions of the same kind.

The downwardly-facing surfaces of each platen portion are covered by filter cloth (not shown) and the portions themselves are provided with apertures, so that in use fluid expressed from the mould cavity below can escape into the troughs 8A, 9A which form drain channels defined between the upstanding walls of the platen portions.

Still referring to FIG. 1, at each side of the press, there is a sidewall constituted by a plate 18 connected by struts 19 to a hinge member 20, which is pivoted to the pillar 4. The free end of the hinge member is connected through a toggle mechanism 21 comprising two linages 22, and 23, the latter pivotably connected to the pillar 4 and the former pivotably connected to the hinge member 20. The connection between the linkages is itself pivotably connected through a follower 24, and a lever 25 to a pneumatic cylinder 26. Both sides of the press are identical in this respect, but for convenience, the left-hand side sidewall, in FIG. 1 is shown in the "closed" position whilst the right-hand sidewall is in the "open position", although in normal operation, this would not be the case and both sidewalls would be either open or closed.

Referring now to FIG. 2, at each end of the press, there is a further sidewall 27, the right-hand one being shown "closed" and the left-hand one "open." The sidewalls 27 are mounted for sliding movement along guides 28 which cause them to follow a path away from the filter band and the platen portions. Pneumatic cylinders 29 operate each of the sidewalls 27 through a lever arrangement and linkage, generally indicated at 30.

The operation of the press in carrying out a preferred embodiment of the method of the invention will now be described briefly with reference to the Figures.

Initially, the filter band is stationary, all of the sidewalls 18 and 27 are in the "closed" position and the screwjacks have been operated to put the platen portions into the "fill" position of FIG. 1. An aqueous slurry containing calcium silicate and/or fibre is then pumped into the mould cavity defined between the side walls, the platen portions and the filter band, using a flexible pipe 31 (FIG. 1) connected to an aperture in the left-hand sidewall 18. The slurry is pumped into the cavity until the back pressure due to the accumulation of solids in the cavity 32 is approximately equal to the pumping pressure and the rate of inflow of slurry decreases to zero, or nearly zero.

When the back pressure and pumping pressure reach equilibrium, a condition assessed by monitoring the rate of inflow, (or the rate of fluid escape from the cavity) the supply is cut-off and the screw jacks are operated to move both the platen portions downwardly to reduce the vertical dimension of the cavity to the desired product thickness whilst at the same time de-watering the material in the cavity. After allowing time for drainage of the expressed fluid, the platen portions can be retracted to the "open" position, together with the sidewalls. The filter band can then be moved in the direction indicated by an arrow in FIG. 2 to displace the product 33 clear of the press and on to further processing. e.g. trimming and oven drying. The cycle can then be repeated.

Because the platen portions are individually operated each by four jacks and adjustable relative to one another the products made on a platen press of the kind just described can have greatly improved regularity, in particular as regards their thickness and overall flatness. Any tendency for the pressing operation to produce an uneven thickness and/or slight curvatures requiring smoothing treatments such as sanding or planing can be compensated for by adjusting individual screw jacks. Also, because the pressure is inherently distributed evenly over the whole platen area, the frame of the press need not be as massive as would be required in a single hydraulic rampress of the conventional kind. As many platen portions as are required to make a given product length may be used. Drainage of the expressed fluid from the troughs 8A, 9A formed by the platen portions can be augmented by mounting the press with one end slightly higher than the opposite end, thereby enabling the fluid to be readily removed by gravity, although the exact amount of tilt will depend on the volume of fluid to be removed, the latter being, of course, related to the nature of the slurry as well as to the size/thickness/density of the product.

The rate of drainage can also be increased by pumping the expressed fluid from the troughs 8A and 8B. This is useful when a second sheet or slab is made on top of another slab, because a major part of the fluid will have to escape upwards into these troughs, the first-formed sheet or slab being relatively impermeable.

I claim:

1. A filter press for making sheet products from a liquid slurry comprising:

(i) a plurality of movable platen portions disposed end-to-end lengthwise of the press to form a single unitary surface (ii) a filter material opposite said unitary surface (iii) a plurality of individual screw jack actuating means, for each platen portion, adjustable relative to one another (iv) a common drive shaft connected to all of said screw jack actuating means, for movement of all of the platen portions substantially simultaneously as a single platen (v) sidewall means defining, with said plurality of platen portions and said filter material, a single mould cavity.

2. A filter press according to claim 1 in which the actuating means for each platen portion is at least four screw jacks.

3. A filter press for making sheet products from a liquid slurry comprising:

(i) a plurality of movable platen portions disposed end-to-end lengthwise of the press to form a single unitary surface.

(ii) a plurality of individual screw jack actuating means, for each platen portion, adjustable relative to one another, (iii) a common drive shaft connected to all of the screw jack actuating means, for movement of all of the platen portions substantially simultaneously as a single platen, (iv) a plurality of sidewall members swingably movable into and out of substantially sealing relation with the periphery of the plurality of platen portions, (v) an endless filter band opposed to said plurality of platen portions, said sidewall members and said endless filter band, together with said plurality of platen portions, defining a single mould cavity.

4. A filter press according to claim 3 wherein one sidewall member is also moveable in a direction away from the filter band so as to enable advancement of the filter band through the press to carry a product out of the mould cavity.

5. A filter press according to claim 3 wherein each of the platen portions have drain channels defined by upstanding walls extending from the platen portion surface opposite the filter band, said surface further have aperatures extending through the surface and in communication with said drain channels and said surface is covered by a filter cloth to form a liquid permeable surface for draining liquid expressed through the surface.

6. A filter press according to claim 5 wherein said drain channels extend lengthwise of the press and wherein said channels slope at an angle to the horizontal so that expressed liquid tends to drain from the channels to one end of the press under gravity.

7. A filter press, according to claim 3, wherein each platen portion has a width substantially equal to the width of the product to be made.

8. A press according to claim 3 in which the movable sidewall members are hinged.

* * * * *